United States Patent [19]
Settlemyer

[11] 3,827,218
[45] Aug. 6, 1974

[54] VALVELESS LOW PRESSURE AIR DEHUMIDIFIER

[75] Inventor: Bernard W. Settlemyer, Coraopolis, Pa.

[73] Assignee: Ajax Magnethermic Corporation, Warren, Ohio

[22] Filed: Aug. 31, 1972

[21] Appl. No.: 285,549

[52] U.S. Cl.................................... 55/179, 55/387
[51] Int. Cl............................................ B01d 53/00
[58] Field of Search............ 55/33, 35, 62, 179, 387

[56] References Cited
UNITED STATES PATENTS

| | | | |
|---|---|---|---|
| 2,083,732 | 6/1937 | Moore et al. | 55/62 X |
| 2,621,899 | 12/1952 | Larson | 55/179 X |
| 2,975,860 | 3/1961 | Westeren | 55/62 X |
| 3,147,095 | 9/1964 | Kanuch | 55/62 X |
| 3,400,511 | 9/1968 | Yamanouchi | 55/179 X |

Primary Examiner—Frank A. Spear, Jr.
Assistant Examiner—Richard W. Burks

[57] ABSTRACT

A low pressure air dehumidifier is disclosed in which damper means responsive to pressure caused by air flow from air intake blowers controls the flow of air through the dehumidifier. Where the dehumidifier includes two adsorbent beds having alternating drying and regeneration cycles, the blowers are operated alternately to thereby cause one vent means to open and allow moist air to flow through a drying bed. During this time the other blower is off and the other vent means is closed. The two adsorbent beds are connected on their downstream sides so that dry air leaving one of the beds flows through the other bed to thereby regenerate the latter.

2 Claims, 1 Drawing Figure

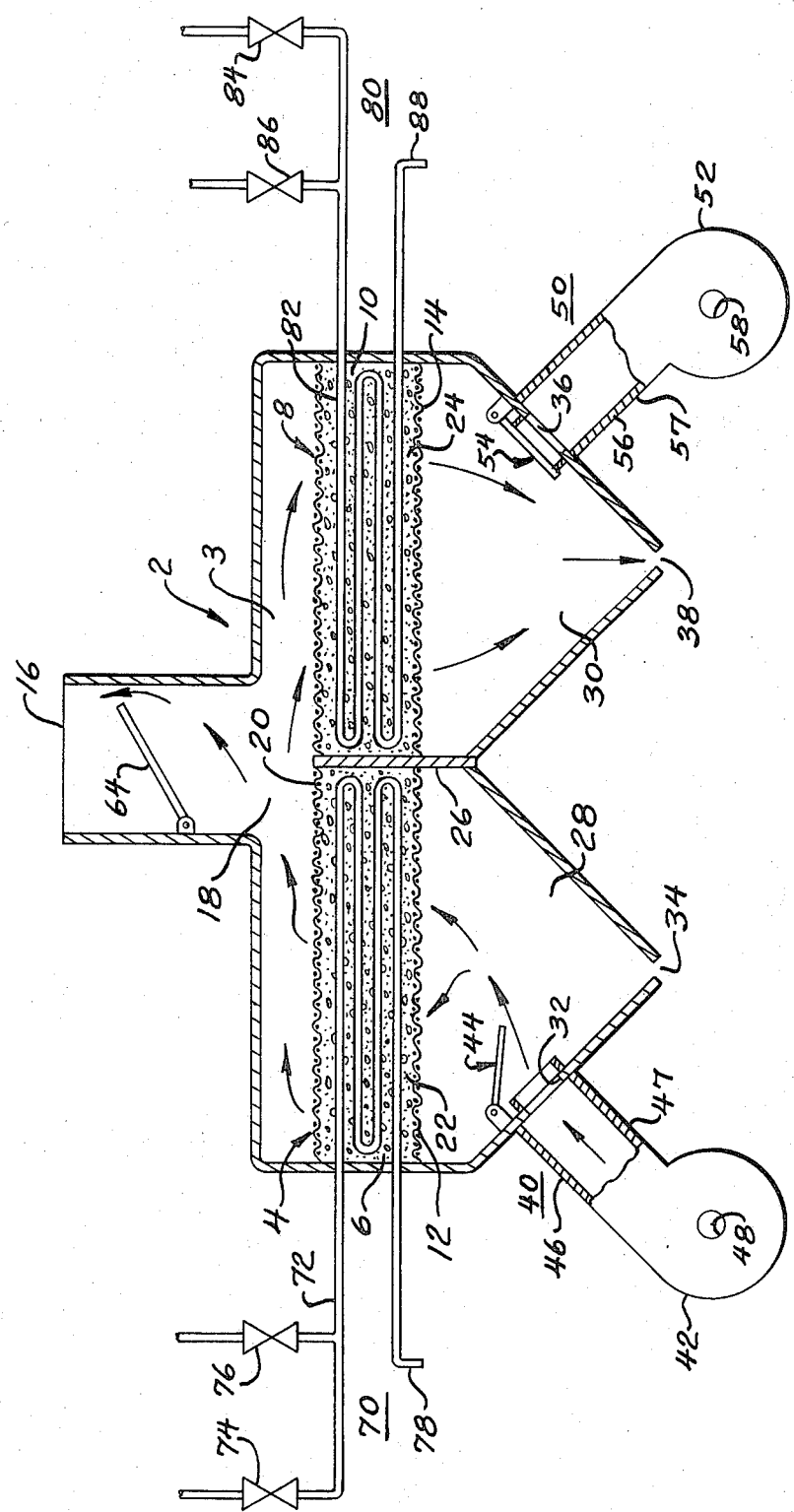

VALVELESS LOW PRESSURE AIR DEHUMIDIFIER

BACKGROUND OF THE INVENTION

This invention relates to air dehumidifying apparatus, and more particularly, to a low pressure dual bed air dehumidifying apparatus in which valves are not required to control the flow of air to the beds of the drying apparatus.

Apparatus for the low pressure dehumidification of air by the method of contacting it with an adsorbent material or desiccant, such as activated alumina, is well known. In typical systems of this type, the air to be dried is passed for a period of time through a first bed of adsorbent material until the bed becomes substantially saturated with moisture. At this point, removal of moisture by the absorbent bed is stopped by the use of a valve. The first bed is then regenerated by flowing air through the bed which can carry moisture from the bed and the flow of this regenerating air is also controlled by a valve. At the same time, flow of moist air to be dried is transferred to a second bed by the use of a valve and the moist air is dried in the second bed until the second bed becomes saturated. The position of the valves is then changed so that the second bed is regenerated and the first bed again dries the moist air. The drying and regenerating periods of each bed is continuously alternated by proper control of the valves. A disadvantage of such dehumidifying apparatus is that the valves required for controlling the air flow through the apparatus are quite expensive and raise the cost of the entire dehumidification apparatus considerably.

SUMMARY OF THE INVENTION

It is a general object of the invention to provide a low pressure air dehumidification apparatus utilizing an adsorbent material and which does not require expensive valve mechanisms for controlling the flow of air through the dehumidification apparatus.

A more specific object of the invention is to provide damper means responsive to air flow into the dehumidification apparatus for controlling the air flow through the apparatus.

The objects of the invention are accomplished by providing full control means comprising a blower and damper means connected to the housing of a dehumidification apparatus. The housing contains a bed of moisture adsorbent material and includes a moist air entrance to which the blower is connected and which is closed by the damper means. The damper means is movable to open the moist air entrance in response to pressure caused by air flowing from the blower. Where the apparatus includes two adsorbent beds alternating in their drying cycles, a damper means and a blower for each adsorbent bed is provided and the blowers and damper means operate alternately to permit only one bed to dry incoming moist air while the other bed is being regenerated by the dry air leaving the drying bed.

BRIEF DESCRIPTION OF THE DRAWING

The single figure of the drawing illustrates, partially in cross section, a low pressure air dehumidifier apparatus in accord with the instant invention.

DESCRIPTION OF THE PREFERRED EMBODIMENT

Referring to the drawing, a housing 2 is shown as containing a bed 4 of adsorbent material 6 and a bed 8 of adsorbent material 10. The adsorbent material 6 and 10 may be of any suitable moisture adsorbent material or desiccant such as activated alumina. The beds 4 and 8 respectively include supporting floors 12 and 14 which permit flow of air through them and through the adsorbent beds 4 and 8. The housing 2 also includes a dry air exhaust outlet 16 and an air flow channel 18 connecting the downstream side of the adsorbent beds 4 and 8 and the dry air exhaust outlet 16. A manually controlled damper 64 for controlling the amount of air exhausting from the dehumidification apparatus is pivotally mounted in the exhaust outlet 16. The downstream side of the adsorbent beds 4 and 8 is designated by the numeral 20 and upstream sides of the adsorbent beds 4 and 8 are designated by the numerals 22 and 24. The air partition 26 separates the beds 4 and 8. The partition 26 also divides the housing 2 into the two separate chambers 28 and 30 on the upstream sides of beds 4 and 8. The chamber 28 has a moist air entrance 32 and a regenerating air outlet 34. The chamber 30 has a moist air entrance 36 and a regenerating air outlet 38. The air 3 has the flow directions within the housing 2 as indicated by the arrows.

The flow control means 40 includes a blower 42 and a damper means 44. An air intake passage 46 extends from the moist air entrance 32 and the blower is connected to the end 47 of the air intake passage 46. The damper means 44 is pivotably mounted within the chamber 28 in closing engagement with the moist air entrance 32. It may be noted that damper means 44 is maintained in a position such that a portion of its movement is in vertical directions. Although a damper means 44 is shown as a pivotably hinged cover, it should be understood that it may be of a different construction such as a cover means slidable into and out of closing engagement with the moist air entrance 32. When the blower 42 is not operating, the weight of the damper means 44 holds it in its closed position. It should also be understood that movement of the damper means 44 can be aided or restricted by a means such as a spring (not shown) in the event that the weight of the damper means 44 does not give the exact closing and opening operation desired. The blower 42 has a moist air intake 48 and thus the moist air flows through the air intake passage 46 and against the damper means 44. In response to the pressure caused by the air flow in air intake passage 46, the damper means 44 opens to allow the moist air to flow through the entrance 32 into the chamber 28 and through the bed 4.

A second flow control means 50 includes a blower 52 and a damper means 54. An air intake passage 56 is connected to the moist air entrance 36 and extends from the chamber 30. The blower 52 is connected to the end 57 of the air intake passage 56 and has a moist air entrance 58. A damper means 54 is pivotably mounted within the chamber 30 in closing engagement with the entrance 36. The other aspects of the flow control means 50 are similar to those of flow control means 40 and therefore will not be described in further detail.

Heat transfer means 70 and heat transfer means 80 are respectively provided for the adsorbent beds 4 and 8. The heat transfer means 70 includes pipe means 72 embedded in the adsorbent material 6 of the bed 4. The pipe means 72 extends to a hot water valve 74 and cold water valve 76 on one end and terminates at a drain outlet 78 on the other end. The hot water valve 74 and cold water valve 76 are respectively connected to sources of hot and cold water (not shown) and are controllable to admit either hot or cold water into the pipe means 72 and thus through the bed 4. The heat transfer means 80 includes pipe means 82 embedded in the adsorbent material 10 of the bed 8. The pipe means 82 extends to a hot water valve 84 and cold water valve 86 on one end and terminates at a drain outlet 88 on the other end. The hot water valve 84 and cold water valve 86 are respectively connected to sources of hot and cold water (not shown) and are controllable to admit either hot or cold water into the pipe 82 and thus through the bed 4. A cycle control means (not shown) which may be any of several types which are well known in the art is also provided to sense the moisture saturation level of the beds 4 and 8 and control the on or off condition of the blowers 42 and 52 and the position of the valves 74, 76, 84 and 86 so that either hot or cold water is flowing through the pipe means 72 and 82.

In operation, one of the blowers 42 and 52 is one while the other blower is off. For example, assume the cycle control means has operated such that the blower 42 is on, blower 52 is off, valve 76 is open, valve 74 is closed, valve 86 is closed and valve 84 is open. Under these conditions moist air will flow through the air intake passage 46 and against the damper means 44 to thereby move the damper means 44 to its open position as shown in the drawing and permit the moist air to flow into the chamber 28 and through the adsorbent bed 4. As the moist air flows through the adsorbent bed 4, the adsorbent material 6 removes moisture from the air. Further, due to cooling of the air by cold water flowing through the pipe means 72 in the bed 4, the ability of the moist air to lose water is enhanced. During this period of operation, the adsorbent bed 4 is in drying operation. The relatively dry air leaving the bed 4 flows through the air flow channel 18 and part of the dry air flows out of the dry air exhaust outlet 16 and part of the dry air flows through the adsorbent bed 8 in a direction reverse to the flow of air through the adsorbent bed 4. Since hot water is flowing through the pipe means 82 embedded in adsorbent bed 8 while the dry air is flowing through the bed 8, moisture in the bed 8 will be evaporated and the dry air will carry the moisture from the bed 8 out of it and out of the housing 2 through the chamber 30 and the air outlet 38. During this time, the bed 8 is in a regenerating condition. Since the blower 52 is off while the bed 8 is in its regenerating condition, there is no moist air flow through the moist air entrance 36 and therefore there is no interference with the flow of the regenerating air out of chamber 30 through outlet 38. Note that while either one of the blowers 42 and 52 is operating, there is some moist leakage air that leaves either chamber 28 or 30 through the regenerating air outlets 34 or 38. The air flow at the various inlets and outlets and within the housing 2 is shown in the drawing for the condition of blower 42 being on and blower 52 being off. It should be understood that the air flow directions will be similar but in a reverse direction when blower 52 is on and blower 42 is off. For example, when blower 52 is on, the damper means 54 will be in its open position, the damper means 44 will be in its closed position, the adsorbent bed 8 will be in drying operation and the adsorbent bed 4 will be in regenerating operation. The cycle controls means, previously mentioned, may be designed to operate such that the operation of the blowers 42 and 52 and the drying and regenerating of beds 4 and 8 will alternate continuously so that drying of air is also carried on continuously.

It can thus be seen that a continuously operating low pressure air dehumidifier has been provided in which expensive valve mechanisms are eliminated. Rather than use a standard type of valve, the air flow is controlled by a simple damper means which is movable between open and closed positions in response to air flow and resulting pressure caused by blowers flowing air into the dehumidifier.

While only a single specific embodiment of the invention has been shown herein, it will be realized that many modifications thereof are feasible without departing from the spirit and scope of the invention. It is accordingly intended that the scope of the invention is not to be limited to the specific embodiment disclosed.

I claim:
1. In an apparatus for drying air flowing therethrough, the combination comprising:
   housing means providing first and second chambers each containing a bed of adsorbent material having an upstream side and a downstream side;
   channel means providing fluid communication at all times during the operation of said apparatus between said downstream sides of said beds;
   said channel means having exhaust outlet means therein;
   said housing means including means separating said chambers on the upstream sides of said beds whereby said upstream sides are not in direct fluid communication;
   means affording opening means in each said chamber on the upstream side of each said bed at least a part of which is in direct fluid communication with air to be dried at all times during the operation of said apparatus;
   means for alternately forcing incoming moisture-laden air to be dried into first one and then the other of said chambers on the upstream side of said beds whereby one of said chambers is active and the other of said chambers is inactive for drying air and whereby the incoming air flows through one of said beds for drying and then outwardly into said channel means, part of the dried air passing through said exhaust outlet means and part of the dried air automatically entering the downstream side of the other bed and flowing backwardly therethrough to dry and regenerate said other bed and be exhausted through said opening means on the upstream side of the chamber containing said other bed;
   and heat transfer means within each of said beds of adsorbent material for alternately lowering the temperature of the adsorbent material when the chamber containing said material is active for drying air, and raising the temperature of the adsorbent material when said chamber is inactive for drying air and said adsorbent material is being dried and regenerated.

2. In the combination according to claim 1:

said means affording opening means in each said chamber on the upstream sides of said beds comprising a first opening in said chamber in fluid communication at all times with air to be dried and a second opening;

said means for alternately forcing incoming moisture-laden air into said chambers being connected to said second openings;

damper means normally closing said second openings from the inside of said chambers, said damper means responsive to the flow of incoming air to automatically open when the respective chambers are active and to remain closed when the respective chambers are inactive for drying air.

* * * * *